United States Patent [19]

Kazem

[11] 3,792,289
[45] Feb. 12, 1974

[54] SOLID STATE CIRCUIT BREAKER

[76] Inventor: Abdollah Kazem, 1236 E. Edinger Suite H, Santa Ana, Calif. 92705

[22] Filed: July 3, 1972

[21] Appl. No.: 268,529

[52] U.S. Cl. .............................. 307/125, 317/33 SC
[51] Int. Cl. .............................................. H02h 7/00
[58] Field of Search.... 307/125, 252 B, 252 N, 202; 338/22 SD; 317/33 R, 33 SC, 22

[56] References Cited
UNITED STATES PATENTS

| | | | |
|---|---|---|---|
| 3,668,471 | 6/1972 | Ambler et al. | 317/18 D |
| 3,543,090 | 11/1970 | Pfister et al. | 317/33 SC |

Primary Examiner—Robert K. Schaefer
Assistant Examiner—M. Ginsburg
Attorney, Agent, or Firm—Lyon & Lyon

[57] ABSTRACT

A fast acting circuit for controlling alternating electric current by placing an impedance element in series between the source and the load and sensing the voltage developing across the element with a trigger circuit where the output of the trigger circuit is coupled to a solid state latching device and also coupled in series with the current source whereby AC current in excess of a pre-selected amount causes the trigger to actuate the latch to interrupt the current flow from the source, the latch maintaining the interruption until manually reset.

6 Claims, 2 Drawing Figures

PATENTED FEB 12 1974 3,792,289

SOLID STATE CIRCUIT BREAKER

BACKGROUND OF THE INVENTION

Circuit protection devices heretofore known and used are principally the fuse type or the mechanical breaker type. The fuse is not technically a circuit breaker but a single use device. Mechanical circuit breakers have the disadvantages of being slow acting, large, subject to wide trip times dependent upon ambient temperature, somewhat wide trip tolerances, and inability to adjust or vary the trip points.

SUMMARY OF THE INVENTION

The present invention provides a circuit for controlling alternating electric current and has the particular advantage of overcoming the aforementioned difficulties of prior circuit breaker systems in that it has extremely fast response to overload, the trip point can be set within closer tolerances to a desired value and the trip point can be readily adjusted. Current interruption from source to load is accomplished by using a triac, a bilateral semiconductor control device. A series impedance is placed in the circuit to be protected and the input of a trigger circuit is coupled across the impedance so as to be responsive to voltage drop variations across the impedance. The output of the trigger circuit is coupled to a solid state latching device which controls the triac to interrupt current flow. The latch remains in the interrupted state until such time as current flow is re-established by manually resetting the circuit. The response time of the circuit may be as fast as one-half cycle, whatever the operating frequency may be.

It is an object, therefore, of the present invention to provide an improved current limiting circuit which through the utilization of solid state devices throughout provides an effective circuit breaking device of considerable precision and having a very short response time.

Further objects and advantages of the present invention will become readily apparent upon reading the ensuing detailed description in conjunction with the accompanying drawings.

DESCRIPTION OF THE INVENTION

Figure 1:
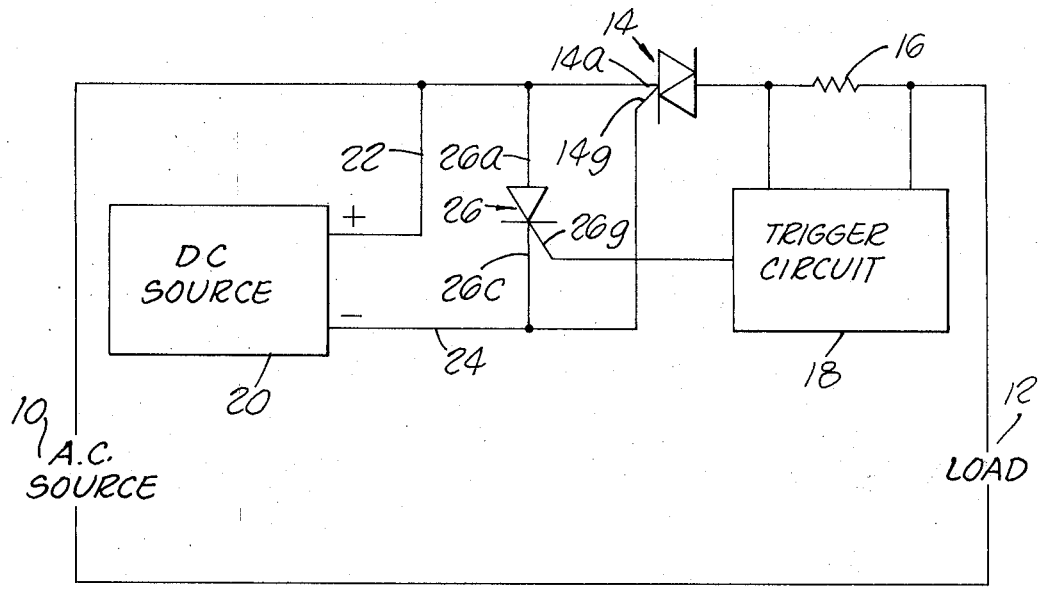
FIG. 1 is a schematic diagram setting forth the basic features of the circuit with other features in block diagram representation.

Referring first to FIG. 1, the circuit of the present invention is conceived to be connected between an AC source 10 and the intended load 12. A triac 14 is placed in series with the source 10 and an impedance 16 placed in series with the triac and the load 12. A trigger circuit 18 has its input connected across the series impedance 16. A source of DC voltage 20 has its positive electrode 22 coupled to the AC source 10 and to electrode 14a of the triac. The negative terminal 24 of source 20 is coupled to the gate electrode 14g of triac 14. A silicon controlled rectifier 26 has one electrode 26a connected to electrode 14a and the other electrode 26c connected to the negative terminal 24 of source 20. The gate electrode 26g is coupled to the output of trigger circuit 18.

DC source 20 provides sufficient bias on the gate electrode 14g so that the triac conducts AC current without substantial attenuation so that current flows through impedance 16 to the load 12. If current through impedance 16 is below a pre-selected level, there will be no output from the trigger circuit 18 so that SCR 26 will be non-conductive. If AC current through impedance 16 exceeds a pre-selected amount, such that the voltage thereacross exceeds the triggering level of circuit 18, an output will be produced at gate electrode 26g sufficient to cause SCR 26 to conduct. When SCR 26 conducts, it will reduce the bias potential between electrode 14a and gate electrode 14g causing triac 14 to become non-conductive thereby interrupting current flow to the load 12. Having once been triggered, SCR 26 will remain conductive because current is available from DC source 20 connected across SCR 26. This will keep triac 14 in its non-conductive state until such time as current through SCR 26 is interrupted.

Figure 2:
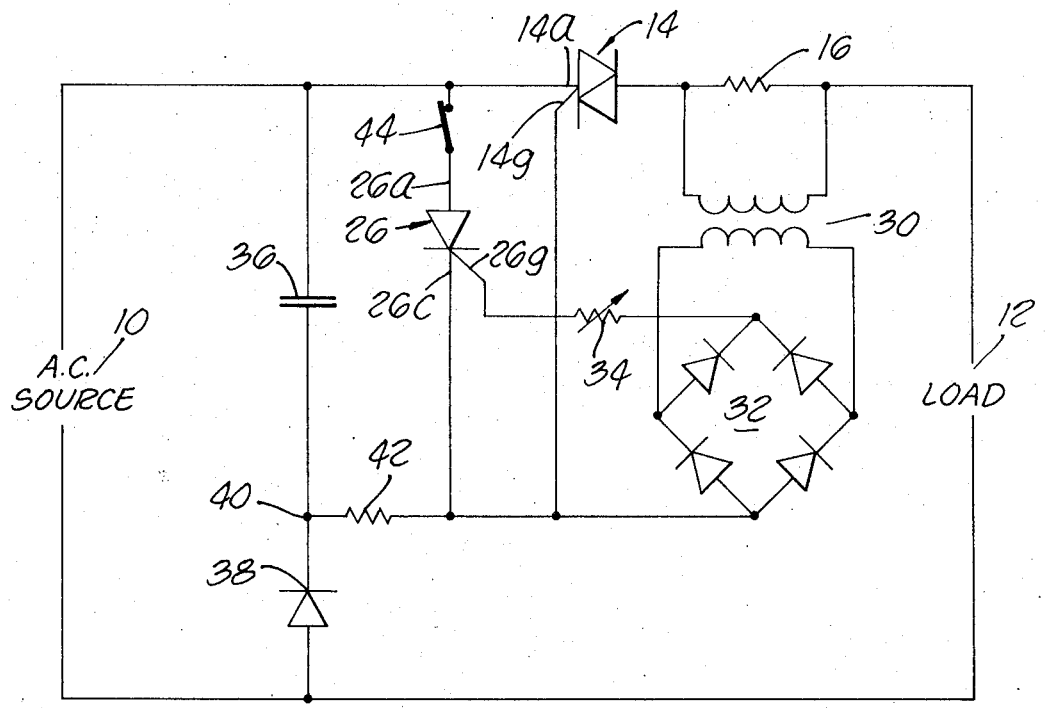
FIG. 2 is a more detailed circuit diagram setting forth one manner of implementing the invention.

FIG. 2 sets forth various additional circuit means for implementing what is shown in FIG. 1. Here, a step-up transformer 30 is coupled across the series impedance 16 with the secondary of transformer 30 coupled across a full wave bridge rectifier circuit 32. one side of the bridge rectifier 32 provides an output which is coupled through a variable resistor 34 to gate electrode 26g. Across the AC source 10 is connected in series a capacitor 36 and a diode 38 and to point 40 between the capacitor and diode is connected a resistor 42. The other end of resistor 42 is connected to electrode 26c of the SCR 26, to the gate electrode 14g and to the opposite side of the rectifier 32. A normally closed switch 44 is connected between electrodes 26a and 14a. Here, the variable resistor 34 provides a means for adjusting the trigger point at which SCR 26 will become conductive. The normally closed switch 44 provides the previously mentioned means for interrupting current through SCR 26 to reset the circuit.

While a particular embodiment of the present invention has been shown and described, including a particular circuit configuration for practicing the invention, as shown in FIG. 2, it will be understood by persons skilled in the art that other configurations of the circuitry are possible to accomplish the features of the present invention and it is contemplated that all such changes and modifications as fall within the true scope and spirit of the invention are within the scope of the appended claims.

I claim:

1. A solid state AC circuit breaker system having a pair of input terminals adapted to be coupled to an external power supply and a pair of output terminals adapted to be coupled to an external load, the system comprising:

bilateral semi-conductor control means, impedance means coupled in series circuit relationship with said bilateral control means, one of said input terminals, and one of said output terminals, said bilateral control means having a gate electrode and having con-ductive and nonconductive states;

trigger circuit means having input and output terminals, said trigger means having the input terminals thereof coupled to said impedance means whereby said trigger means provides an output signal which is a measure of current through said impedance means when said current exceeds a predetermined level;

latching means coupled between an electrode of said bilateral control means and the gate electrode thereof, said latching means having a control electrode coupled to the output terminal of said trigger means, said latching means having conductive and nonconductive states, said latching means responsive to the output of said trigger means to change from its nonconducting to its conducting state; and a source of DC potential coupled to said latching means and to the gate electrode of said bilateral control means, said DC source operative to bias said bilateral control means in its conductive state when said latching means is in its nonconductive state, said latching means in its conductive state operative to bias said bilateral control means in its nonconductive state.

2. The system set forth in claim 1 further including reset means coupled to said latching means for interrupting conduction through said latching means to restore conduction through said bilateral control means.

3. The system set forth in claim 1 further including switch means coupled in series with said latching means, said switch means being normally closed, said switch means when momentarily opened interrupting conduction through said latching means to restore conduction through said bilateral means.

4. The system set forth in claim 1 further including variable current control means coupled in series between the output terminal of said trigger means and the control electrode of said latching means whereby the current level at which said latching means changes from the non-conductive to the conductive state may be set.

5. The system set forth in claim 1 wherein said trigger circuit means includes a transformer having a primary and a secondary, said primary being coupled across said impedance means, and a full wave rectifier coupled across said secondary.

6. A solid state AC circuit breaker system having a pair of input terminals adapted to be coupled to an external power supply and a pair of output terminals adapted to be coupled to an external load, the system comprising:

bilateral semi-conductor control means having an input electrode, an output electrode and a gate electrode, impedance means coupled in series with the output electrode of said bilateral control means and one of said output terminals, said bilateral control means having conductive and nonconductive states;

trigger circuit means having input and output terminals, said trigger means having the input terminals thereof coupled to said impedance means whereby said trigger means provides an output signal which is a measure of current through said impedance means when said current exceeds a predetermined level;

latching means coupled to said bilateral control means, said latching means comprising a silicon controlled rectifier (SCR) having anode, cathode, and gate electrodes, the anode of said SCR connected to the input electrode of said bilateral control means, the cathode of said SCR connected to the gate electrode of said bilateral control means, the gate electrode of said SCR connected to the output terminal of said trigger circuit means, said SCR being responsive to said output signal of said trigger means to change from a nonconducting to a conducting state; and a source of DC potential coupled across the anode and the cathode of said SCR and to the gate electrode of said bilateral control means, said DC source operative to bias said bilateral control means in its conductive state when said SCR is nonconductive, said SCR in its conductive state operative to bias said bilateral control means in its nonconductive state.

* * * * *